United States Patent
Giorgianni et al.

(10) Patent No.: US 6,882,451 B2
(45) Date of Patent: Apr. 19, 2005

(54) METHOD AND MEANS FOR DETERMINING ESTIMATED RELATIVE EXPOSURE VALUES FROM OPTICAL DENSITY VALUES OF PHOTOGRAPHIC MEDIA

(75) Inventors: Edward J. Giorgianni, Rochester, NY (US); John D. Buhr, Fairport, NY (US); Cynthia A. Pellow, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 747 days.

(21) Appl. No.: 09/732,671

(22) Filed: Dec. 8, 2000

(65) Prior Publication Data

US 2002/0114014 A1 Aug. 22, 2002

(51) Int. Cl.[7] ............................................... H04N 1/46
(52) U.S. Cl. ............................................ 358/506; 382/169
(58) Field of Search .................................. 382/132, 169, 382/274; 358/3.1, 521, 529, 505, 530, 506; 430/24, 333, 494; 355/402

(56) References Cited

U.S. PATENT DOCUMENTS

| | | | | |
|---|---|---|---|---|
| 3,718,074 A | | 2/1973 | Davis | 95/1.1 |
| 4,500,919 A | | 2/1985 | Schreiber | 358/78 |
| 5,051,341 A | * | 9/1991 | Muenter et al. | 430/359 |
| 5,060,061 A | * | 10/1991 | Shishido et al. | 358/506 |
| 5,063,407 A | * | 11/1991 | Takagi | 355/68 |
| 5,267,030 A | | 11/1993 | Giorgianni et al. | 358/527 |
| 5,563,717 A | | 10/1996 | Koeng et al. | 358/406 |
| 5,671,060 A | * | 9/1997 | Takahashi et al. | 356/405 |
| 5,956,044 A | | 9/1999 | Giorgianni et al. | 345/431 |
| 6,233,069 B1 | * | 5/2001 | Buhr et al. | 358/519 |
| 6,369,901 B1 | * | 4/2002 | Buhr et al. | 358/1.1 |
| 6,701,007 B1 | * | 3/2004 | Yamaguchi | 382/162 |

* cited by examiner

*Primary Examiner*—Jerome Grant, II
(74) *Attorney, Agent, or Firm*—Peyton C. Watkins

(57) ABSTRACT

This invention relates to an apparatus and method for providing calibration of photographic media. More particularly, the method and apparatus are based on measurements of areas of minimum optical density of a given photographic medium. Such measurements, when combined with reference optical density vs. exposure calibration data for related photographic media, provide an estimate of the optical density vs. exposure relationship of the given photographic medium. The method and apparatus of this invention are especially applicable for the calibration of photographic media used in hybrid imaging applications.

2 Claims, 9 Drawing Sheets

METHOD AND MEANS FOR DETERMINING ESTIMATED RELATIVE EXPOSURE VALUES FROM OPTICAL DENSITY VALUES OF PHOTOGRAPHIC MEDIA

CROSS REFERENCE TO RELATED APPLICATIONS

Reference is hereby made to U.S. Pat. No. 5,267,030 entitled METHODS AND ASSOCIATED APPARATUS FOR FORMING IMAGE DATA METRICS WHICH ACHIEVE MEDIA COMPATIBILITY FOR SUBSEQUENT IMAGING APPLICATIONS filed in the names of E. J. Giorgianni and T. E. Madden, to U.S. Pat. No. 5,956,044 entitled IMAGING DEVICE TO MEDIA COMPATIBILITY AND COLOR APPEARANCE MATCHING WITH FLARE, LUMINANCE, AND WHITE POINT COMPARISON filed in the names of E. J. Giorgianni and T. E. Madden, and to U.S. Pat. No. 5,563,717 entitled METHOD AND MEANS FOR CALIBRATION OF PHOTOGRAPHIC MEDIA filed in the names of F. R. Koeng and E. J. Giorgianni.

FIELD OF THE INVENTION

This invention relates generally to calibration of color-imaging systems. More particularly, the invention relates to an apparatus and method for providing an estimated calibration of photographic media, based on one or more measurements of one or more areas of minimum optical density of the media. The methods and apparatus of this invention are especially applicable for calibration of photographic media used in hybrid imaging applications.

BACKGROUND OF THE INVENTION

Color imaging systems known in the art permit images to be captured by certain color-imaging media, possibly digitized and stored, and then output onto complementary media. So, for instance, color images may be first captured on negative-working silver-halide-based photographic film and then reproduced on negative-working photographic paper. Such images may or may not pass through a digital intermediary stage. In another case, color images may be captured on positive-working photographic materials, known as transparencies, and then viewed directly by projection or back-illumination, or copied onto larger or smaller transparencies, or printed onto positive-working photographic paper. Again, such images may or may not pass through a digital intermediary stage.

Color-imaging systems in which the image passes through a digital intermediary stage are often referred to as "hybrid" imaging systems because they combine elements of photographic or other chemical-based imaging together with various elements of electronic imaging systems. Hybrid systems can offer advantages such as convenient image modification, image editing, and image storage.

A hybrid imaging system must include a method for scanning or otherwise measuring the individual picture elements of the photographic media, which serve as input to the system, to produce input image-bearing signals. In addition, the system must provide a means for transforming the input image-bearing signals produced by the input scanning device to intermediary image-bearing signals, i.e., to an image representation or encoding that is appropriate for the subsequent applications of the system. Accurate transformation of the input image-bearing signals to and from the encoded image representation requires calibration of the various input and output media and devices of the system. Techniques for such calibrations are well know to those skilled in the art.

For example, U.S. Pat. No. 4,500,919 entitled COLOR REPRODUCTION SYSTEM by W. F. Schreiber, discloses an image reproduction system of one type in which an electronic reader scans an original color image and converts it to electronic image-bearing signals. A computer workstation and an interactive operator interface, including a video monitor, permit an operator to edit or alter the image-bearing signals by means of displaying the image on the monitor. When the operator has composed a desired image on the monitor, the workstation causes the output device to produce an inked output corresponding to the displayed image. Calibration procedures are described for transforming the image-bearing signals to an image representation or encoding so as to reproduce the colorimetry of a scanned image on the monitor and to subsequently reproduce the colorimetry of the monitor image on the inked output.

U.S. Pat. No. 5,956,044 entitled IMAGING DEVICE TO MEDIA COMPATIBILITY AND COLOR APPEARANCE MATCHING WITH FLARE, LUMINANCE, AND WHITE POINT COMPARISON by E. J. Giorgianni and T. E. Madden, describes an imaging system in which image-bearing signals are converted to a different form of image representation or encoding, representing the corresponding colorimetric values that would be required to match, in the viewing conditions of a uniquely defined reference viewing environment, the appearance of the rendered input image as that image would appear if viewed in a specified input viewing environment. The described system allows for input from disparate types of imaging media, such as photographic negatives as well as transmission and reflection positives. In that disclosure, images are digitally encoded in terms of the color appearance of the image being scanned (or of the rendered color appearance computed from a photographic negative medium being scanned), and calibration procedures are described so as to reproduce that color appearance on the monitor and on the final output device/medium.

The colorimetric image representation or encoding described by Schreiber is appropriate and desirable for applications where the intent is to represent the colorimetry of an image reproduced directly on, or to be subsequently produced from, a color-imaging medium being scanned into the imaging system. The color-appearance image representation or encoding described by Giorgianni/Madden is appropriate and desirable for applications where the intent is to represent the color appearance of colors as reproduced directly on, or to be subsequently produced from, various color-imaging media scanned for input to the system. In each of these descriptions, the photographic image being scanned is taken to be the original to be reproduced. While calibration is described in each of these systems to allow the appropriate reproduction of the scanned image, neither system provides or requires calibration of the input photographic medium, i.e., calibration which would describe the relationship of the scanned image to the original scene or other source of exposure which caused the photographic image to form. Because each system treats the scanned photographic image as the original to match, such input-medium calibration generally is not required. In some cases, however, calibration of the input medium still may be desirable so that deficiencies or irregularities of the particular medium can be compensated for via subsequent signal processing.

It is well known to those skilled in the art that the colors reproduced on, or produced from, a photographic color-imaging medium generally are not colorimetric matches of the actual colors originally photographed by the medium. Colorimetric differences can be caused by the color recording properties of the medium, i.e., its formation of a latent image in response to exposure. Colorimetric errors can also be produced by the color reproduction properties of the medium, i.e., properties related to color image formation subsequent to color image recording. These reproduction properties include the characteristics of the medium's chemical signal processing, such as the relationship between exposure and dye formation within each layer and the chemical relationships among the various image-forming layers of the medium. Color reproduction is also influenced by the colorimetric properties of the image-forming dyes of the medium.

For some hybrid-imaging applications, such colorimetric differences from original-scene colorimetry are not necessarily detrimental. Indeed, such differences may even be desirable. For example, a photographic slide film might be deliberately designed to enhance the reproduced chromas of certain colors. However, in other hybrid imaging applications, it is not desirable to represent the colors of the image as they appear on, or as they are produced from, the color-imaging medium being scanned into the system. In such applications, it would instead be desirable to form image representations that correspond more closely to the colorimetric values of the colors of the actual original scene that was photographed by the color-imaging medium. Examples of such applications include, but are not limited to, the production of medical and other technical images, product catalogues, magazine advertisements, artwork reproductions, and other applications where it is desirable to obtain color information that is a colorimetrically accurate record of the colors of the original scene. In these applications, the alterations in the color reproduction of the original scene colors by the color recording and color reproduction properties of the imaging medium are undesirable, and the previously described image representations of the prior art are, therefore, also undesirable.

A hybrid imaging system can provide the capability to produce image representations or encodings that represent original scene colorimetric information. A system employing this type of image representation or encoding can form and store a colorimetrically accurate record of the original scene. That record then can be used to produce colorimetrically accurate rendered color images on output devices/media. In addition, a system employing this type of image representation or encoding can be used to produce rendered color images in which the original scene colorimetry has been deliberately and systematically adjusted, based on aesthetic considerations or other criteria.

In order for an imaging system to accurately represent original scene colorimetric information, its image representation or encoding must not include color alterations produced by the color reproduction properties of the imaging medium. U.S. Pat. No. 5,267,030 entitled METHODS AND ASSOCIATED APPARATUS FOR FORMING IMAGE DATA METRICS WHICH ACHIEVE MEDIA COMPATIBILITY FOR SUBSEQUENT IMAGING APPLICATIONS, by E. J. Giorgianni and T. E. Madden, provides a method for deriving, from a scanned image, recorded color information which is free of color alterations produced by the color reproduction properties of the imaging medium. In that patent, a system is described in which the effects of media-specific signal processing are computationally removed, as far as possible, from each input medium used by the system. In addition, the chromatic interdependencies introduced by the secondary absorptions of the image-forming dyes, as measured by the responsivities of the scanning device, are also computationally removed. Consistent with the input media compatibility objectives of that invention, each input image is transformed to an image representation or encoding corresponding to the exposures recorded from the original scene, or other source of exposure, which caused the image to form on the input imaging-recording medium. That exposure information then can be transformed to any of a number of different colorimetric representations or renderings.

In that disclosure, the extraction of recorded exposure information from each input medium allows for input from disparate types of imaging media, such as conventional photographic negatives and transmission and reflection positives. That same process of extracting recorded exposure information also can be used to effectively eliminate any contribution to color inaccuracy caused by chemical signal processing and by the properties inherent in the image-forming dyes.

However, the elimination of color inaccuracies caused by chemical signal processing requires a foreknowledge of such processing, i.e., a knowledge of the relationship between the latent image exposures recorded by the photographic medium and the amounts of the image-forming dyes, or the resulting measured optical densities, that are produced from those exposures. Those skilled in the art will recognize that the density vs. exposure relationships are subject to variability that may be caused by variations in the manufacturing of the photographic medium, by changes that occur after the manufacturing of the photographic medium, by variations in the photographic development and other chemical processing of the medium, and possibly by other factors. In addition, measurements of optical densities are subject to variability if the characteristics of the measuring device, such as a scanner, change over a period of time.

It is also well known to those skilled in the art that the density vs. exposure relationship for a chemically processed photographic medium can be determined using appropriate calibration procedures. The basic procedure begins with the exposure of a test sample of the photographic medium to a pattern of known exposures. After the film is exposed to the pattern, the medium is chemically processed, and the resulting optical densities are measured and related to their corresponding exposures. There are two types of patterns generally used; a) a continuous wedge that generates exposures from a relatively high exposure value to a relatively low exposure in a continuously varying fashion, and b) an array of spatial patches with stepped exposures of known increments of increasing or decreasing exposure going from one end of the array to the other. The stepped alternative (b) generally is preferred in the trade since this type of pattern has positional indicators at each step rather than only one at the end of the continuously varying pattern as in alternative (a).

In some applications, it would be desirable to include a calibration exposure pattern on the actual photographic medium that is to be used for recording images, rather than on a separate test sample of that medium. It may also be desirable to locate the pattern of exposure as close as possible to the image area. For example, in U.S. Pat. No. 3,718,074, a camera is described that includes apparatus for exposing patterns of exposures on a photographic medium at the time of scene exposure. The patterns of exposures may be produced using the ambient light source or by using a calibrated light source included in the camera. In U.S. Pat. No. 5,563,717, Koeng and Giorgianni describe methods and means for providing calibration of photographic media requiring only a minimal area of the media.

Although the presence of a calibration exposure pattern on the actual photographic medium used for recording images is highly desirable, such calibration often is not available. In such cases, it can be helpful to have calibration for another sample of the actual medium, or for a medium having similar characteristics. That calibration then can be assumed to apply to the actual medium. However, differences among media samples and differences in chemical signal processing can lead to significant differences of the calibrated samples from the actual medium being used for recording images. As a result, the colorimetric accuracy of imaging applications in which the medium is used will be adversely affected. In addition, colorimetric accuracy will be adversely affected if the characteristics of the measuring device, such as a scanner, change over a period of time.

SUMMARY OF THE INVENTION

In view of the foregoing discussion, an object of the present invention is to provide methods and apparatuses for improving the colorimetric performance of color-imaging systems in which photographic media are used.

A further object of the present invention is to provide methods and apparatuses for determining an estimated calibration of photographic media using a measurement of areas of the media having minimum optical densities.

A further object of the present invention is to provide methods and apparatuses for improving the colorimetric performance of color-imaging systems by incorporating the estimated calibration in the signal processing used on the color-imaging systems.

To provide these objects, the present invention provides methods and apparatuses for estimating the density vs. exposure relationship for photographic media. The methods and apparatuses are based on one or more measurements of one or more areas of minimum density of given photographic media, as measured by a given scanning device. Minimum density values derived from those measurements are combined with density vs. exposure calibration data for a similar photographic medium, or for an average of similar photographic media, or for a single reference photographic medium, or for any other related density vs. exposure calibration data, to provide an estimate of the density vs. exposure relationship of the actual media. The advantages of using the methods and apparatuses of this invention will now be discussed.

BRIEF DESCRIPTION OF THE DRAWINGS

The background and the invention will be described with reference to the accompanying drawings, wherein.

DETAILED DESCRIPTION OF THE INVENTION

It is instructive to note that the computational operations of the present invention may be implemented on any well-known computer or by manual means, both of which are well known in the art and will not be discussed in detail herein.

Figure 1:
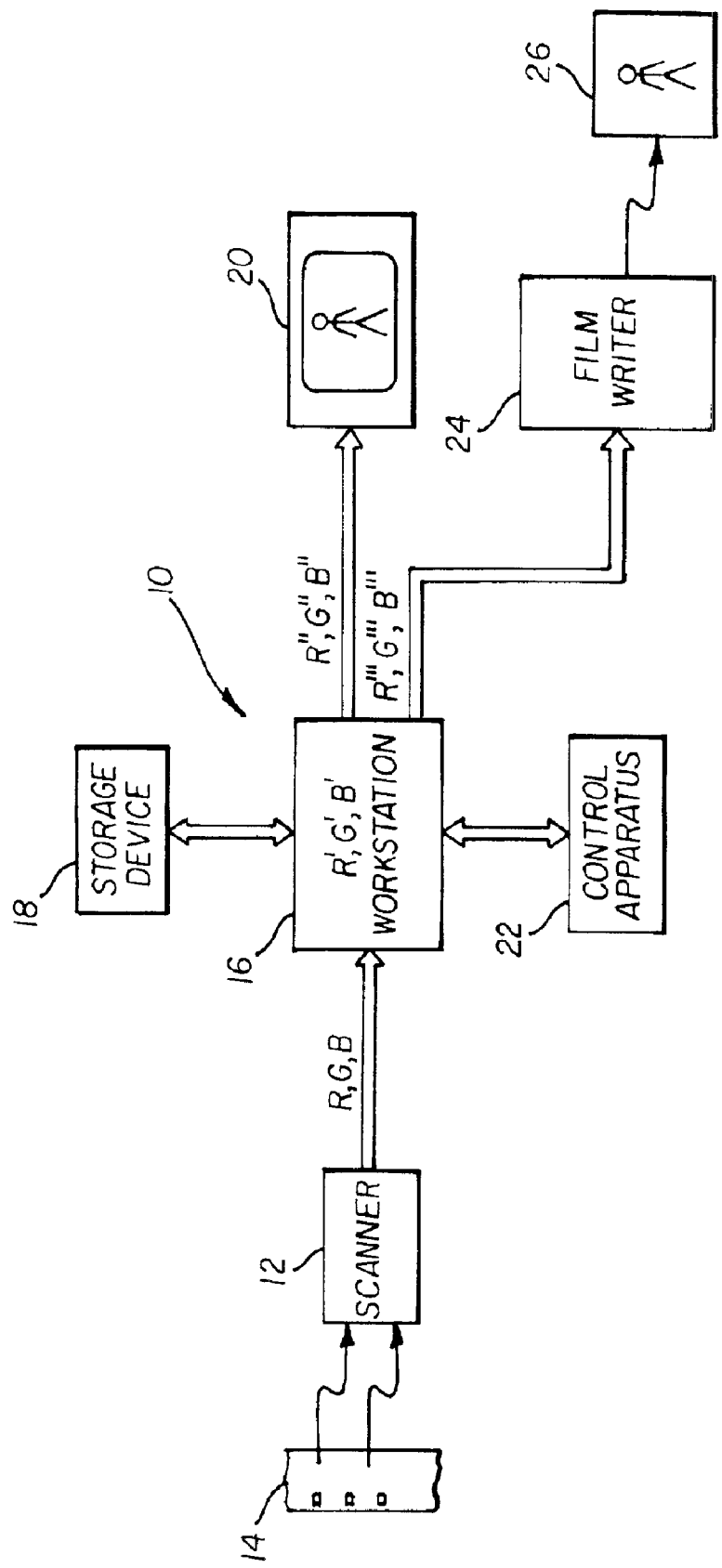
FIG. 1 is a block diagram of a color imaging system in accordance with a preferred embodiment of the invention.

Referring to FIG. 1, there is shown an imaging system 10 with an image scanner 12 that serves for scanning an image on positive or negative photographic film 14, and for producing R, G, B (red, green, and blue) image-bearing signals for each picture element of the image being scanned. A computer-based workstation 16, which receives the image-bearing signals from the scanner transforms the input image-bearing signals into intermediary image-bearing signals R', G', B'. The workstation allows for archival storage of the intermediary image-bearing signals using any of a variety of archival storage writing devices 18, and media such as magnetic tape or disk, or optical disk. The workstation enables an operator to view and edit the image. For that purpose, a video monitor 20, serves to display an image corresponding to an R", G", B" image-bearing signal provided by the workstation. Control apparatus 22, which may include a keyboard and cursor, enables the operator to provide image manipulation commands pertinent to modifying the video image displayed and the reproduced image to be made or stored. An output device 24, which may be a film writer, thermal, ink-jet, electrostatic, or other type of printer, or electronic output device may also be present to receive R''', G''', B''' image-bearing signals from the workstation for output onto the appropriate color-imaging medium 26.

When signal-processing methods and means are used to transform image-bearing signals derived from a photographic medium incorporating the calibration method of the present invention, the resulting intermediary image-bearing signals or encoded values are an accurate representation of the colorimetry of the original scene, or other source of exposure, which caused the medium to be exposed. The intermediary image-bearing signals or encoded values may then be used to store an accurate exposure record of the original scene and/or used to form appropriately rendered images on any of a number of different output devices and media.

One method, as given in U.S. Pat. No. 5,267,030, for performing the mathematical operations for transforming R, G, and B image-bearing signals to intermediary image-bearing signals in the preferred embodiment of the present invention is as follows:

1. R, G, and B image-bearing signals, which correspond to the measured (scanned) transmittances of the input photographic negative, are converted to RGB density values by using appropriate one-dimensional look-up-tables (LUTs),
2. the RGB density values of Step 1 may be adjusted, by using a matrix or a three-dimensional LUT or another type of mathematical operation, to correct for possible densitometric changes in the input scanner over a period of time or for possible differences among scanners in systems where multiple input scanners are used,
3. the RGB density values of Step 2 are adjusted, by using another matrix operation or another three-dimensional LUT or another type of mathematical operation, to remove the chromatic interdependence of the image-bearing signals produced by the unwanted absorptions of the imaging dyes and/or by inter-layer chemical interactions in the input film,
4. the RGB density values of Step 3 are individually transformed through appropriate one-dimensional LUTs, derived such that the neutral scale densities of the input film are transformed to the neutral scale exposures of that film, to produce the linear exposure values that were recorded by the input film and
5. the exposure values of Step 4 optionally may be further transformed by another matrix, a three-dimensional LUT, or any other similar operation to arrive at exposure values that correspond to standard colorimetric values, such as CIE XYZ tristimulus values. Further numerical transformations, such as from XYZ to CIE 1976 L*a*b* (CIELAB) values also may be performed.

Figure 3:
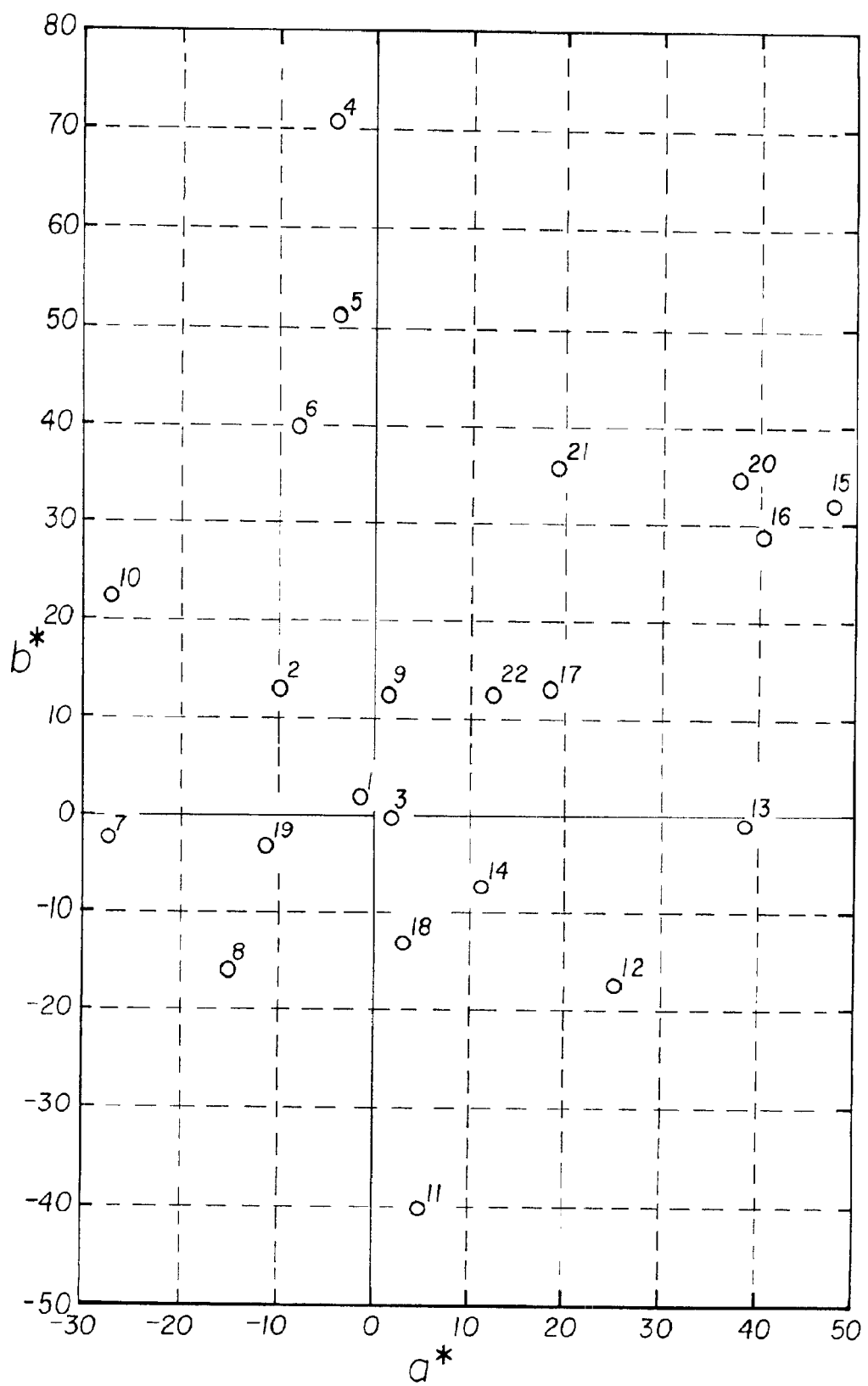
FIG. 3 is a CIELAB diagram illustrating a*, b* values for an array of test colors, wherein the colorimetric values have been derived from scanned-medium-exposure values determined using the neutral scale calibration of the actual scanned medium, as shown in FIG. 2.

The accurate transformation of neutral scale densities of the input film to the neutral scale exposures of that film (Step 4) requires an accurate knowledge of the density-to-exposure relationship. That relationship can be determined for a calibration sample of the photographic film, which would be exposed and processed using a representative chemical process. If the calibration sample is perfectly representative of the actual film being scanned, the accuracy of the RGB exposure values derived in Step 4 can be very high. The accuracy of any CIE standard colorimetric values subsequently computed in Step 5 will be fundamentally limited by the degree of correspondence of the actual spectral sensitivities of the film to a set of color-matching functions for the CIE Standard Colorimetric Observer. That limitation is a separate issue and outside the scope of the present invention, in which the objective is to achieve accurate determinations of scanned-medium exposure values. In the following discussion, the aim colorimetric values, expressed in terms of CIELAB a* and b* values, will be those shown in FIG. 3, which have been derived using the neutral scale calibration of the actual scanned medium.

In practice, the neutral scale density-to-exposure relationship for an actual film being scanned may have been altered by numerous factors such as manufacturing and chemical processing variability. Therefore, the neutral scale for the actual film being scanned may not correspond to that assumed for a particular sampled film and process, nor will the neutral scale necessarily correspond to that of a representative average for the film. A representative average neutral scale may be obtained using a number of methods including, but not limited to, measuring and averaging the density vs. exposure relationship for a number of samples of the same film. In some cases, it might be appropriate to use a neutral scale defined according to the product specifications of the film manufacturer.

Figure 2:
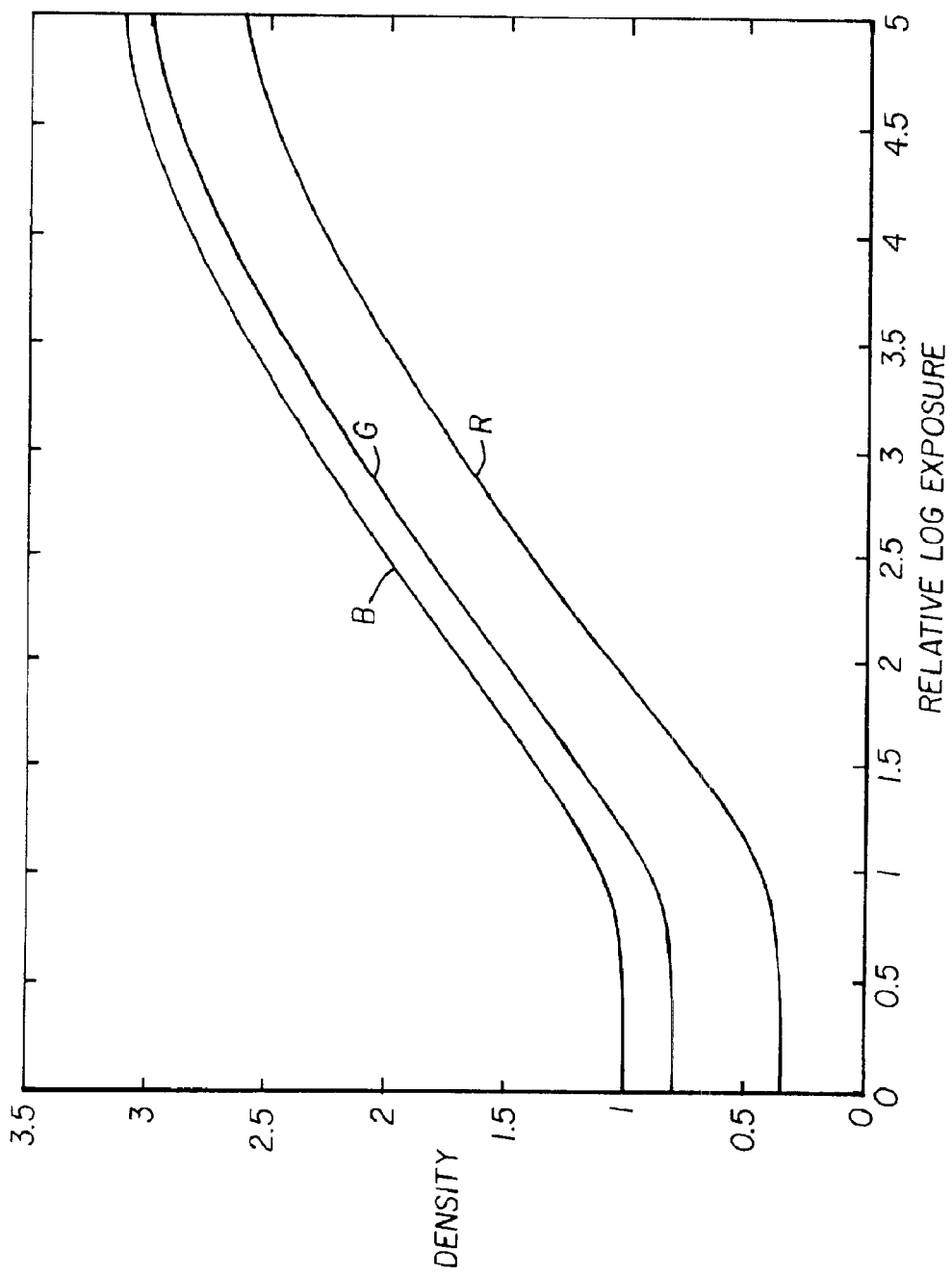
FIG. 2 illustrates the neutral scale of an actual scanned medium used in a preferred embodiment of the present invention. The scale is expressed in terms of red, green, and blue (RGB) density values, which have been transformed so as to be free of chromatic interdependencies, as a function of relative log exposure.
Figure 4:
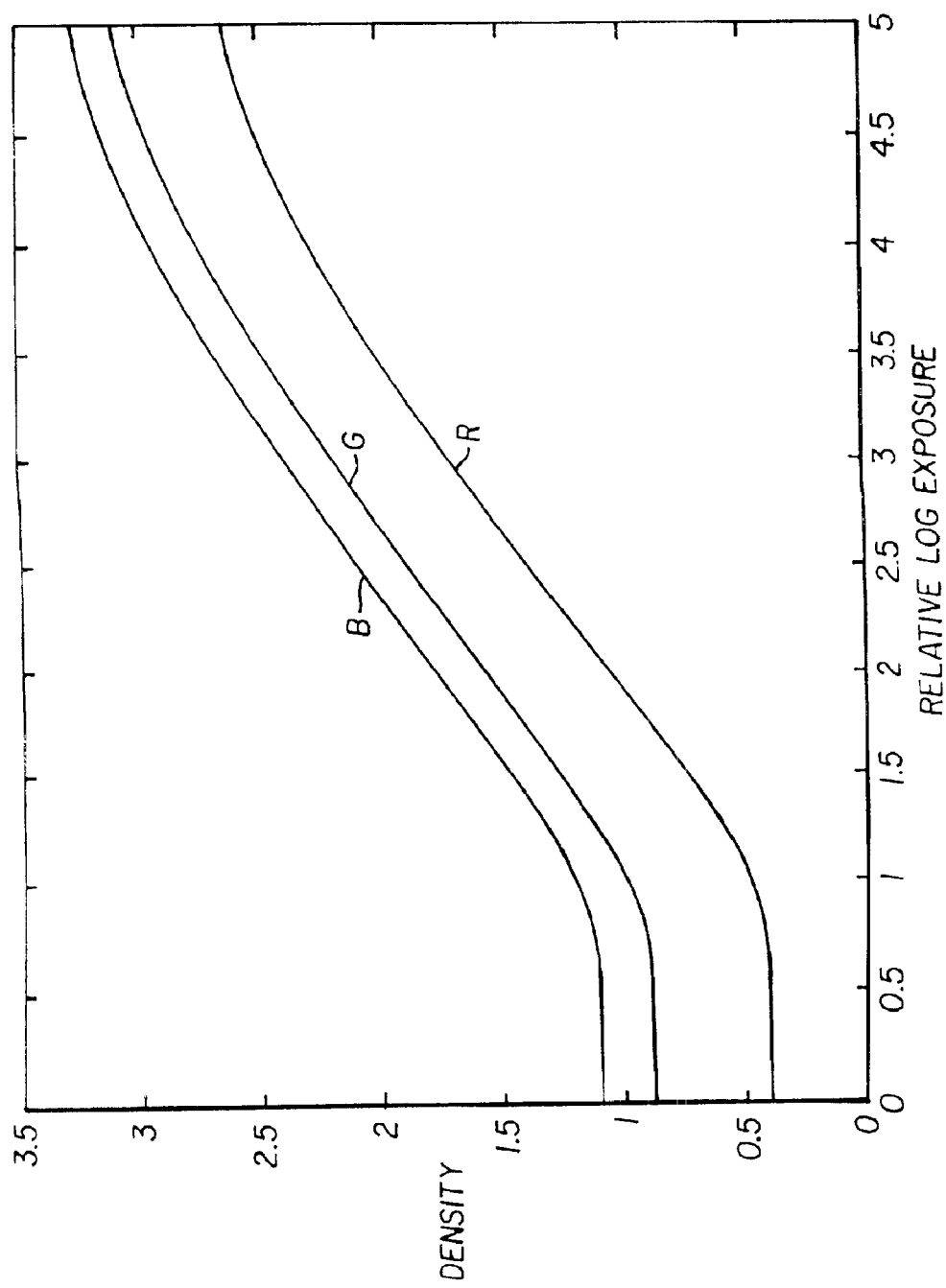
FIG. 4 illustrates a neutral scale that is a representative average of neutral scales for the scanned medium used in a preferred embodiment of the present invention. The neutral scale is expressed in terms of average RGB density values, which have been transformed so as to be free of chromatic interdependencies, as a function of relative log exposure.
Figure 5:
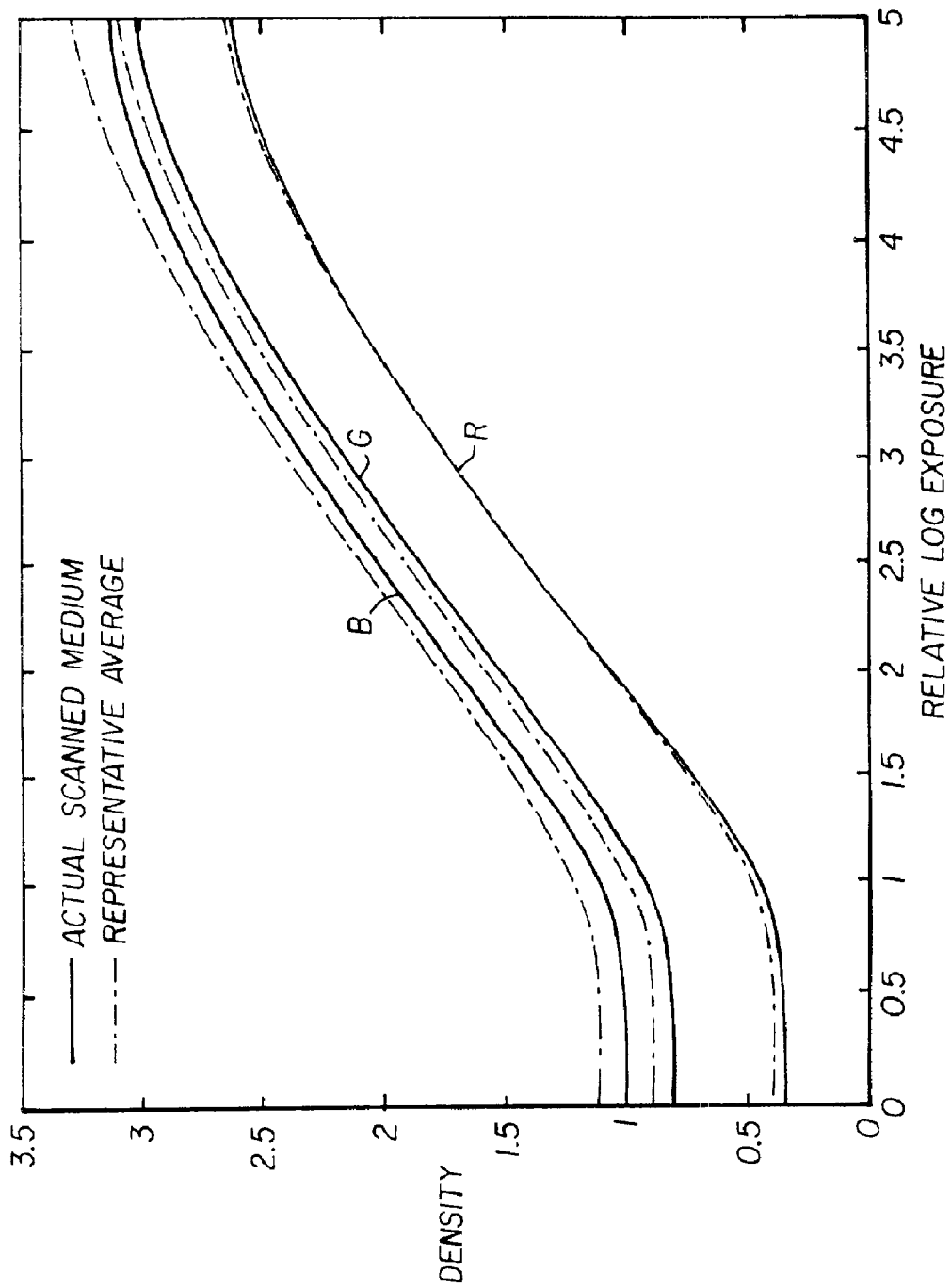
FIG. 5 is a comparison of the neutral scale of the actual scanned medium, as shown in FIG. 2, to that of a representative average for the same medium, as shown in FIG. 4.

FIGS. 2, 4, and 5 compare the actual neutral scale for the scanned film of this embodiment example—measured here only to provide aim colorimetric values as a basis of comparison—to a representative average neutral scale for that film. In each of these figures, the neutral scale is expressed in terms of red, green, and blue (RGB) density values, which have been transformed so as to be free of chromatic interdependencies, as a function of relative log exposure. If in the derivation of exposure values the neutral scale of FIG. 4 is used instead of the actual neutral scale of FIG. 2, significant errors will result. Derived exposure value errors will be particularly large for scanned densities in the non-linear portion of the neutral scale, i.e., densities produced from lower levels of exposure. Such exposure levels would correspond to the lower-exposure components of higher chroma colors, to the exposures of darker colors, and to the exposures of colors within darker areas of a normally exposed frame of film. Such levels also would correspond to most colors in an underexposed frame of film.

Figure 6:
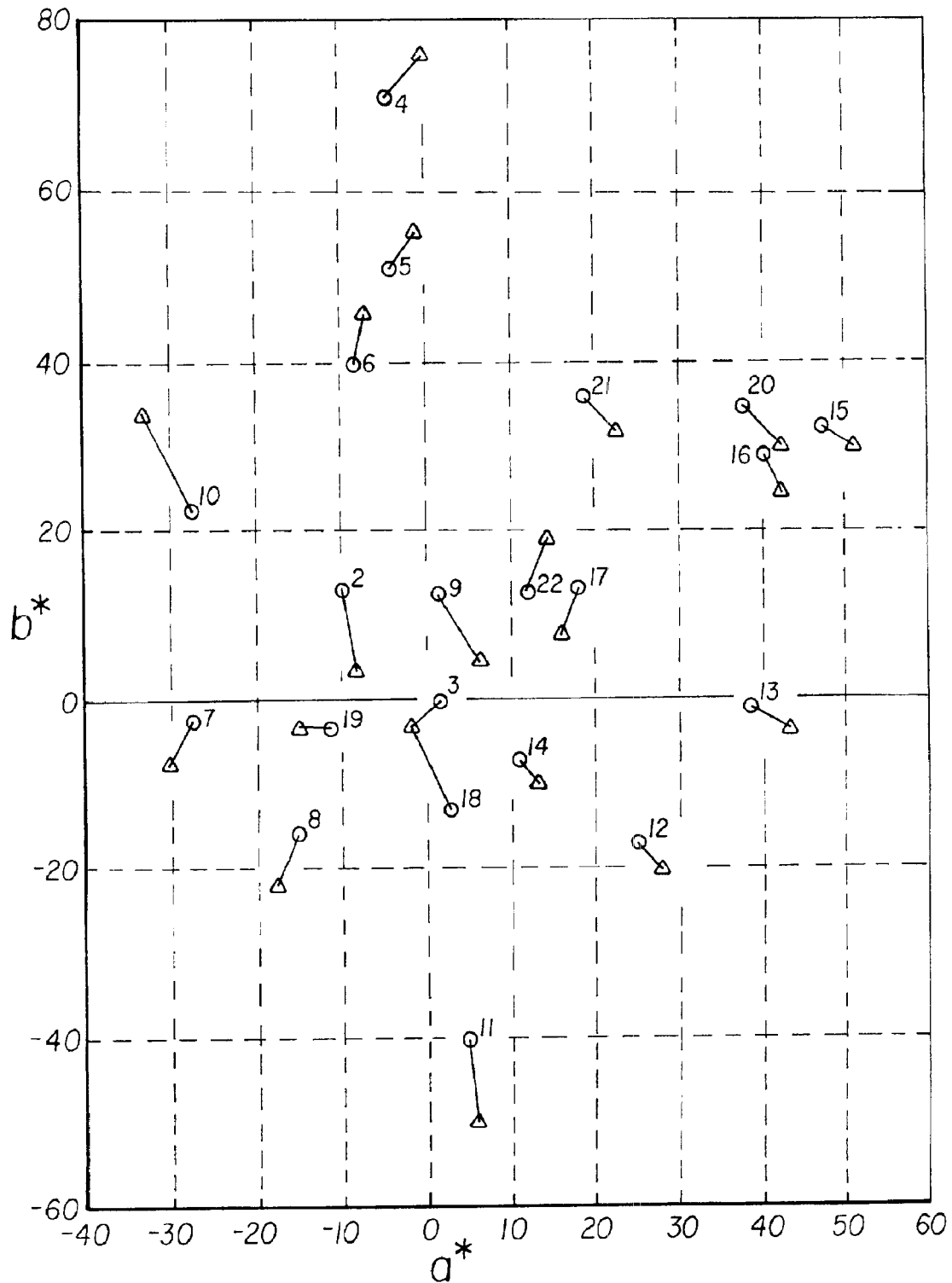
FIG. 6 is a CIELAB diagram illustrating a*, b* values for an array of test colors, wherein colorimetric values have been derived from scanned-medium-exposure values determined using a neutral scale calibration based on the representative average neutral scale for the scanned medium. The vectors illustrate departures from the aim colorimetric values shown in FIG. 3. Overall red, green, and blue exposure-control adjustments have been applied to the determined scanned-medium-exposure values.

If such erroneous exposure values were directly transformed to colorimetric values (Step 5 in the previously described signal-processing sequence), very large colorimetric errors would result. However, these errors can be reduced significantly by the use of appropriate exposure-control adjustment techniques. Such techniques are well known to those skilled in the art. For example, the Photofinisher Imaging Workstations used in the Kodak Photo CD System employ a series of algorithms, collectively referred to as the Scene Balance Algorithm, that automatically adjusts the overall red, green, and blue exposure values such that the resulting adjusted encoded exposure values, and thus the overall density and color balance of the final output image, are appropriate. However, such overall exposure adjustments cannot correct for the differences in magnitudes of the exposure errors that occur as a function of original exposure level. For example, if the red, green, and blue exposure corrections are such that the exposure values of the neutral gray test color are perfectly corrected, errors may still be present in exposure values derived for other test colors. The colorimetric results of such residual exposure errors are shown in FIG. 6, wherein the tails of the vector arrows correspond to the aim a*, b* values shown in FIG. 3, which are based on the actual measured grayscale shown in FIG. 2, and the heads of the vector arrows represent the corresponding CIELAB a*, b* values determined using the average neutral scale followed by appropriate exposure-control adjustments. Note that while neutrality of the gray test color has been obtained (i.e., its a* and b* values are 0.0) as a result of the color-balancing adjustments, other colorimetric errors are still present, particularly in high chroma colors.

Figure 7:
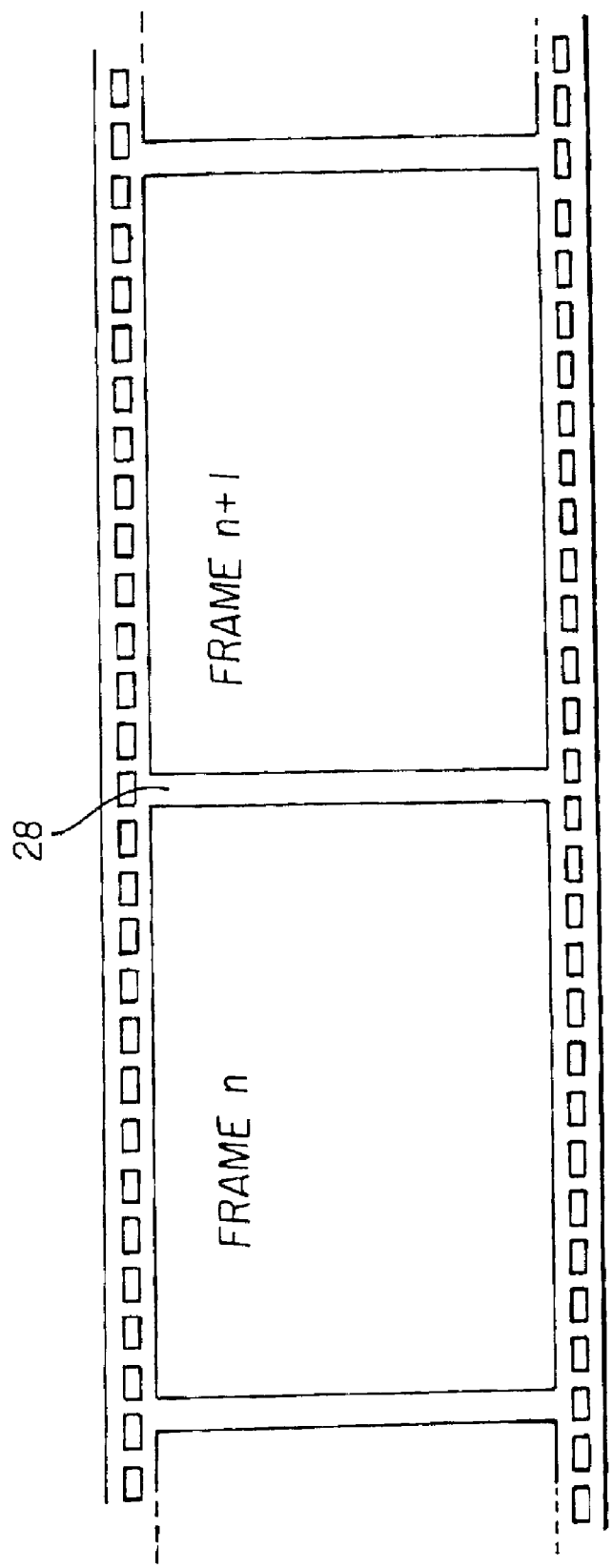
FIG. 7 is a diagram, in accordance with a preferred embodiment of the invention, showing one method for measuring an area of minimum density of a film frame.

To address this problem, the calibration process of the present invention will be applied to provide an estimated determination of the neutral density vs. exposure relationship for each sample of the photographic negative film being scanned. To accomplish this, one or more scanner measurements are made in one or more areas of minimum density on the negative film being scanned. This can be accomplished in a number of ways including, but not limited to: measuring within the unexposed inter-frame gap between frames of 35 mm film; measuring within the unexposed areas between the perforations of 35 mm film; or measuring within the unexposed areas at the beginning and end of Advanced Photographic System (APS) films. FIG. 7, for example, shows the reading of an area within the unexposed inter-frame gap 28 between frames of a 35 mm color negative film. The readings from this area may also be compared to those of various other samples, including areas measured within one or more picture frames. In all cases, multiple readings of a single area and/or single or multiple readings of multiple areas may be read, and appropriate statistical methods, such as averaging and/or minimum-value determination, may be used to derive an optimum set of red, green, and blue minimum-density values $DmR_s$, $DmG_s$, and $DmB_s$, for the film being scanned. Provisions may also be made to avoid false readings, such as those that could be obtained from reading areas in which the film has been scratched or otherwise damaged.

Figure 8:
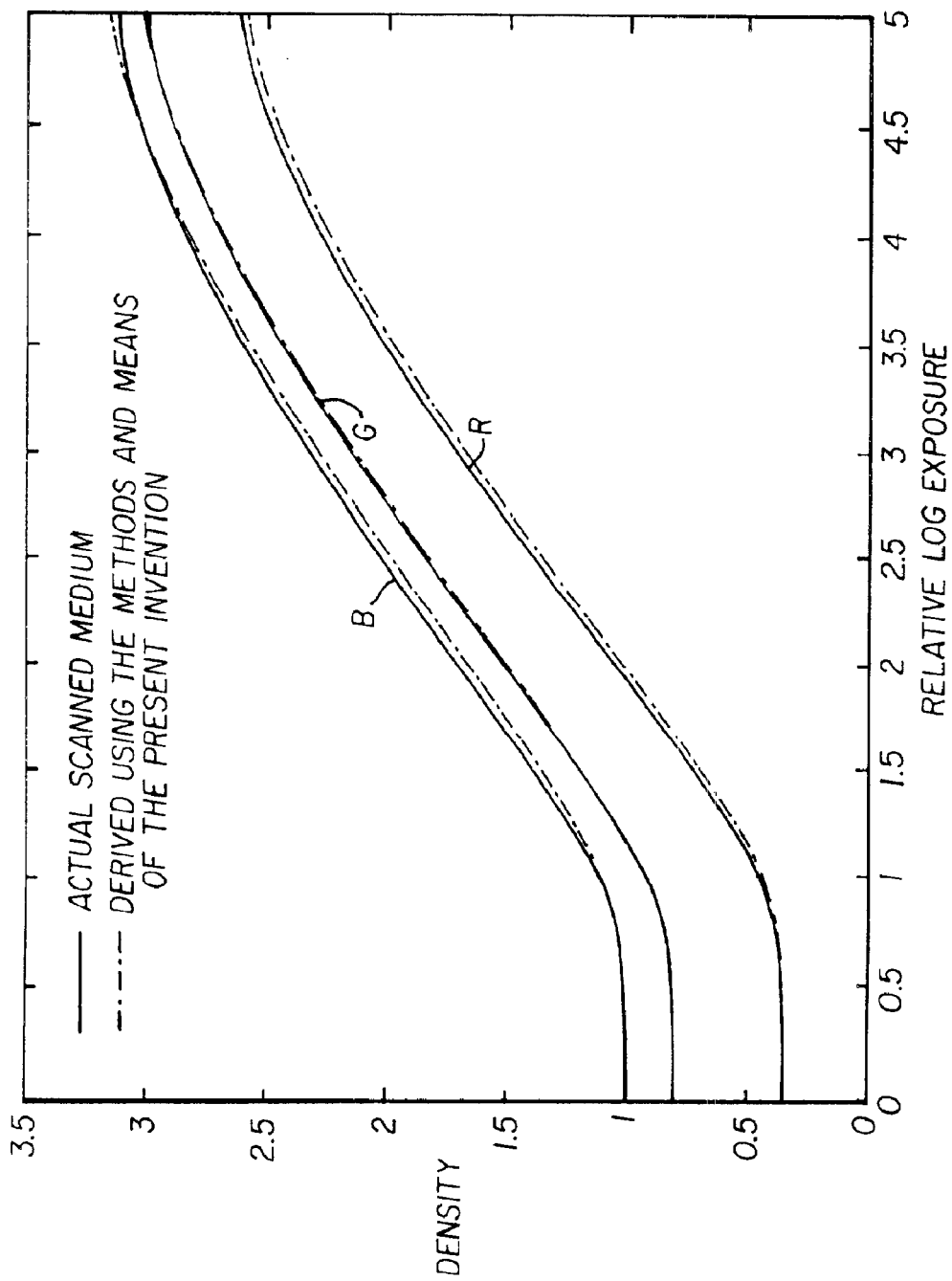
FIG. 8 is a comparison of the neutral scale of the actual scanned medium to a neutral scale derived using the methods and means of the present invention. Each scale is expressed in terms of RGB density values, which have been transformed so as to be free of chromatic interdependencies, as a function of relative log exposure.

The benefit of having measured, rather than assumed, minimum-density values is shown in FIG. 8, which compares the neutral scale of the actual scanned negative film used in this example to an estimated neutral scale derived using the methods and means of the present invention. Note that the estimated neutral scale of FIG. 8 is significantly closer to the actual neutral scale than was the assumed representative average neutral scale, which was shown previously in FIG. 4 and compared to the actual neutral scale in FIG. 5.

The estimated neutral curve shown in FIG. 8 was derived by adjusting the red, green, and blue density values for the representative average film, $DR_a$, $DG_a$, and $DB_a$, based on the differences between the minimum densities of the representative average film, $DmR_a$, $DmG_a$, and $DB_a$, and the measured corresponding minimum densities of the actual film being scanned, $DmR_s$, $DmG_s$, and $DB_s$, $$DR_s = DR_a - (DmR_a - DmR_s)$$

$$DG_s = DG_a - (DmG_a - DmG_s)$$

$$DB_s = DB_a - (DMB_a - DmB_s)$$

where $DR_s$, $DG_s$, and $DB_s$ are the estimated red, green, and blue density values, respectively, for the film being scanned. Note that the estimated neutral scale corresponds quite closely to the actual neutral scale for the scanned film, which was measured here solely to provide a basis of comparison in this example embodiment.

Figure 9:
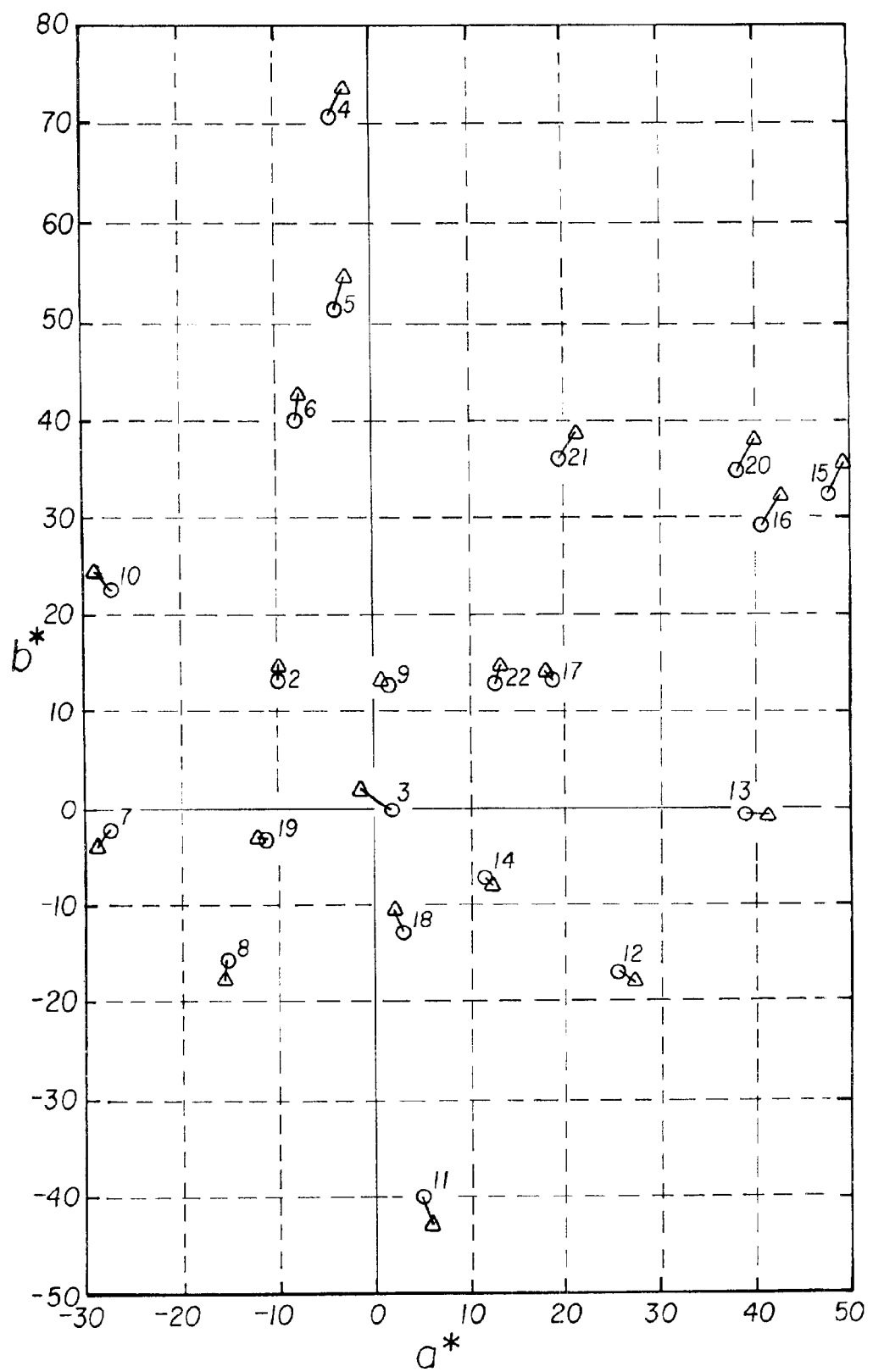
FIG. 9 is a CIELAB diagram illustrating a*, b* values for an array of test colors, wherein colorimetric values have been derived from scanned-medium-exposure values determined using a neutral scale calibration derived using the methods and means of the present invention. The vectors illustrate departures from the aim values shown in FIG. 3.

Use of this estimated neutral scale in Step 4 of the previously described signal-processing sequence can result in significant improvements in colorimetric accuracy. Such improvements are shown in FIG. 9, wherein the tails of the vector arrows correspond to the aim values a*, b* shown in FIG. 3, and the heads of the vector arrows represent the corresponding CIELAB a*, b * values determined using the estimated neutral scale. These results represent a significant improvement over those obtained using the representative average neutral scale, as previously shown in FIG. 6.

Those skilled in the art will recognize that film, chemical process, and scanner variability can result in density changes that are more complex than simple minimum-density shifts. However, minimum-density shifts are quite common. Variations in film manufacturing, film keeping, background radiation exposure, chemical processing, and scanner measurement all can result in such shifts in minimum-density values. Moreover, the magnitudes of these shifts can be quite large. For example, the specified red, green, and blue minimum-density tolerance limits for the Kodak C41 Color Negative Process alone are plus or minus 0.05 ISO Status M density units. As demonstrated in this example, minimum-density shifts can lead to significant colorimetric inaccuracies. Other types of photographic variations, such as speed (log exposure) shifts are somewhat less serious because the automatic balance algorithms commonly incorporated in color-imaging systems largely compensate for them. So although the methods and means of the present invention do not correct for variations other than those manifested in the form of minimum-density shifts, they nevertheless do provide compensation for variations that are quite common, that often are quite large, and that are not fully compensated by other existing methods.

One example of a preferred embodiment has been shown, however many variations are possible. For example, other embodiments in which the use of the described method and means would provide advantages include:

a) the scanning of other types of media, such as photographic transparencies or reflection images, where it is desired to extract exposure values and/or original-scene colorimetric values from scanned image values.

b) signal processing applications wherein scanned image values are to be transformed to rendered or otherwise modified values. For example, in an application in which density values scanned from negatives are rendered to final print colorimetric values using a computational model of a print medium, the present invention can be used to correct scanned density values prior to their input to that print-medium model. Similarly, the present invention can be used to correct scanned density values prior to their use.

c) signal processing applications wherein scanned image values are to be adjusted according to predetermined algorithms, such as automatic density and color-balance algorithms, color-enhancement algorithms, grayscale adjustment algorithms, and so on. In such applications, the present invention can be used to correct scanned density values prior to their input to these algorithms. It would be expected that the performance of such algorithms would improve, since their input values would conform more closely to those for which the algorithms were designed and optimized.

This invention also has been described in detail with reference to the figures and diagrams. Again, however, it will be appreciated that variations and modifications are possible within the spirit and scope of the invention. For example, a) although the invention has been described in terms of a silver-halide based photographic medium, a similar approach can be used for other forms of photographic and non-photographic image-capturing media.

b) the negative medium used in the preferred embodiment formed conventional image dyes in a standard manner, i.e., the red-sensitive, green-sensitive, and blue-sensitive layers formed cyan, magenta, and yellow image dyes, respectively. Other arrangements are also possible, and media using entirely different types of image-forming dyes may be used as long as the scanning operation can detect image signals corresponding to the image-recording layers.

c) black-and-white media, such as those forming silver images, may also be used. In that case, only a single minimum density value need be determined and used in forming the estimated density vs. exposure relationship.

d) the photographic negative film used in the preferred embodiment produces substantially equal increments in density as a function of equal logarithmic increments of exposure over much of its useful dynamic range, thus its density vs. exposure relationship is relatively simple. Those skilled in the art will recognize that methods and means of the present invention would be even more advantageous when used with photographic and other media having more complex density vs. log exposure relationships.

e) one method for transforming image-bearing signals from a scanner to signals that include the recorded exposure values of the image-capturing media has been described. The transformation is comprised of a specific series of discrete operations. Other transformation methods may also be used, as long as the estimated neutral scale derived using the methods and means of this invention is included in the transformation.

The invention has been described in detail with particular reference to certain preferred embodiments thereof, but it will be understood that variations and modifications can be effected within the spirit and scope of the invention.

| PARTS LIST | |
|---|---|
| 10 | imaging system |
| 12 | image scanner |
| 14 | postive or negative photographic film |
| 16 | computer-based workstation |
| 18 | archival storage-writing device |
| 20 | video monitor |
| 22 | control apparatus |
| 24 | output device |
| 26 | color-imaging medium |
| 28 | inter-frame gap |
| R | image bearing signal (red) |
| G | image bearing signal (green) |
| B | image bearing signal (blue) |

What is claimed is:

1. A method for transforming image-bearing signals, derived by scanning a photographic medium, to image-bearing signals that include the relative exposure values of said photographic medium, said method comprising the steps of:

a) transforming said image-bearing signals to density values;

b) transforming said density values to remove the chromatic interdependencies of said values so as to produce channel-independent density values;

c) determining a reference density vs. exposure relationship for each color channel of said photographic medium;

d) performing at least one measurement of at least one area of minimum density of said photographic medium;

e) forming, for each color channel, an estimated density vs. exposure relationship of said photographic medium by adjusting the density values of said reference density vs. exposure relationship according to a difference of the minimum density value of said reference density vs. exposure relationship and the measured minimum density value of said photographic medium; and f) transforming, for each color channel, the channel-independent density values using the corresponding estimated density vs. exposure relationship to produce image-bearing signals that include the relative exposure values of the photographic medium.

2. The method according to claim 1 and further comprising the step of:

g) further transforming the image-bearing signals of step f) to form standard colorimetric values.

* * * * *